(12) United States Patent
Ellis

(10) Patent No.: US 10,651,026 B2
(45) Date of Patent: May 12, 2020

(54) METHOD AND APPARATUS FOR ACOUSTIC OR TACTILE PRESENTATION OF CHEMICAL SPECTRUM DATA

(71) Applicant: Queen's University at Kingston, Kingston (CA)

(72) Inventor: Randy E. Ellis, Kingston (CA)

(73) Assignee: Queen's University at Kingston, Kingston, ON (CA)

( * ) Notice: Subject to any disclaimer, the term of this patent is extended or adjusted under 35 U.S.C. 154(b) by 83 days.

(21) Appl. No.: 16/054,155

(22) Filed: Aug. 3, 2018

(65) Prior Publication Data

US 2019/0043707 A1 Feb. 7, 2019

Related U.S. Application Data

(60) Provisional application No. 62/541,383, filed on Aug. 4, 2017.

(51) Int. Cl.
| | |
|---|---|
| *H04R 1/00* | (2006.01) |
| *H01J 49/42* | (2006.01) |
| *H04R 3/00* | (2006.01) |
| *G01J 3/44* | (2006.01) |
| *H01J 49/00* | (2006.01) |
| *H04R 1/02* | (2006.01) |

(52) U.S. Cl.
CPC ............... *H01J 49/427* (2013.01); *G01J 3/44* (2013.01); *H01J 49/00* (2013.01); *H04R 1/028* (2013.01); *H04R 3/00* (2013.01); *H04R 2400/03* (2013.01)

(58) Field of Classification Search
CPC ...... H04R 3/00; H04R 2400/03; H04R 1/028; G01J 3/44; H01J 49/427; H01J 49/00
See application file for complete search history.

(56) References Cited

FOREIGN PATENT DOCUMENTS

| WO | WO2016/015108 A1 | 2/2016 |
|---|---|---|
| WO | WO2016/142689 A1 | 9/2016 |
| WO | WO2016/142692 A1 | 9/2016 |

OTHER PUBLICATIONS

Pereira, F., et al., "Sonified Infrared Spectra and Their Interpretation by Blind and Visually Impaired Students", Journal of Chemical Education, vol. 90, pp. 1028-1031 (2013).

*Primary Examiner* — Matthew A Eason
(74) *Attorney, Agent, or Firm* — Stephen J. Scribner

(57) ABSTRACT

An apparatus for presenting a chemical spectrum to a human user in an audible and/or tactile format comprises an input that receives at least one chemical spectrum, a processor, and at least one transducer that produces the audible and/or tactile output. The processor identifies a first component and a second component of at least one value of the at least one chemical spectrum, selects at least one periodic function for each first component, and modulates the at least one periodic function according to the second component. Modulated periodic functions are composed into at least one complex function which is output to the at least one transducer to produce the audible and/or tactile output. The chemical spectrum may comprise data obtained from a sample using mass spectrometry, Raman spectroscopy, or the like.

21 Claims, 4 Drawing Sheets

METHOD AND APPARATUS FOR ACOUSTIC OR TACTILE PRESENTATION OF CHEMICAL SPECTRUM DATA

RELATED APPLICATION

This application claims the benefit of the filing date of Application No. 62/541,383, filed 4 Aug. 2017, the contents of which are incorporated herein by reference in their entirety.

FIELD

This invention relates to a method for providing chemical spectra to a user by vibrations. The vibrations may be acoustic sounds, tactile vibrations, or a combination thereof.

BACKGROUND

A common way of providing information about a chemical spectrum to a human user is graphically, wherein the ordinate axis is related to the mass properties of a substance being sampled and the abscissa axis is presented as non-negative values, each value being related to the transduced relative concentration of at least one constituent of the substance. One such chemical spectrum is mass spectrometry, whereby the constituents are ionized and the mass/charge ratios of ions are transduced. For example, the spectrum of a pure chemical under near-ideal analytical conditions may have a single non-zero value in the spectrum. In another example, a substance that comprises a plurality of chemical constituents may have a large number of non-zero values in the spectrum.

A common way of using chemical spectra involves signal processing of the spectra. The signal processing can, for example, be intended to remove noise or to detect a relative peak in a chemical spectrum. Signal processing can be used to reduce a multi-valued chemical spectrum to a single value, for example, by detecting a plurality of peaks that correspond to a chemical or a chemical mixture.

In practice, a transduced chemical spectrum of a substance may not correspond to the superposition of the chemical spectra of its constituents. For example, two chemical constituents of a substance may interact so as to enhance or suppress the transduced chemical spectrum of the substance. The processes of sampling the substance and ionizing the substance may further affect the transduced chemical spectrum. It can be appreciated that human interpretation of a graphical presentation of a chemical spectrum is an imperfect art, and that automated interpretation may be a difficult process.

Recent developments in mass spectrometry can provide ensembles of chemical spectra. One such ensemble is a mass-spectrometry image (MSI). One means of transducing such an MSI is by matrix-assisted laser desorption ionization mass spectrometry (MALDI), whereby a substance is spatially sensed in a spatial array. Another means of transducing such an MSI is by desorption electrospray ionization mass spectrometry (DESI), which also spatially senses a substance. An MSI is powerful in providing an estimate of the spatial distribution of chemical constituents of a substance, with the drawbacks of attenuation of the spectra of the constituents. Automated interpretation of an MSI is an active field of research.

Another recent development in mass spectrometry can provide a temporal sequence of chemical spectra. One such sequence is provided by rapid evaporative ionization mass spectrometry (REIMS), whereby a vaporized portion of a substance is sensed by a method that is substantially a form of mass spectrometry, such as is used in DESI. Because the vaporizer can be physically moved over or within a substance, the temporal sequence of chemical spectra can provide an estimate of the spatial distribution of chemical constituents of a substance, with the attending drawbacks.

SUMMARY

According to one aspect of the invention there is provided a method for presenting a chemical spectrum, comprising: a) acquiring at least one chemical spectrum, the at least one chemical spectrum comprising at least one value, the at least one value having at least a first component and a second component; b) selecting at least one periodic function for each first component of the at least one value of the at least one spectrum, wherein the periodic function is selected by a single spectrum value or by a plurality of spectrum values; c) modulating the at least one periodic function according to the second component of the at least one value; d) composing modulated periodic functions into at least one complex function; e) outputting each complex function using at least one transducer.

Another aspect of the invention provides an apparatus, comprising: an input that receives at least one chemical spectrum, the at least one chemical spectrum comprising at least one value, the at least one value having at least a first component and a second component; a processor that: i) selects at least one periodic function for each first component of the at least one value of the at least one spectrum, wherein the periodic function is selected by a single spectrum value or by a plurality of spectrum values; ii) modulates the at least one periodic function according to the second component of the at least one value; iii) composes the modulated periodic functions into at least one complex function; and a transducer that outputs each complex function.

According to another aspect of the invention, there is provided programmed media for use with a computer, the programmed media comprising a computer program stored on non-transitory storage media compatible with the computer, the computer program containing instructions to direct the computer to perform one or more of: a) acquire at least one chemical spectrum, the at least one chemical spectrum comprising at least one value, the at least one value having at least a first component and a second component; b) select at least one periodic function for each first component of the at least one value of the at least one spectrum, wherein the periodic function is selected by a single spectrum value or by a plurality of spectrum values; c) modulate the at least one periodic function according to the second component of the at least one value; d) compose modulated periodic functions into at least one complex function; and e) output each complex function to an acoustic device, a tactile device, or a combination thereof.

According to the above aspects, in various embodiments the at least one chemical spectrum signal comprises a mass-spectrometry signal or a Raman-spectroscopy signal.

According to the above aspects, in various embodiments modulating each periodic function comprises amplitude-modulating each periodic function according to the second component of the at least one value.

According to the above aspects, in various embodiments modulating each periodic function comprises frequency-modulating each periodic function according to the second component of the at least one value.

According to the above aspects, in various embodiments the composing comprises summation.

According to the above aspects, in various embodiments outputting comprises producing an acoustic output using a loudspeaker, or producing a tactile output using a vibrating member, or producing an acoustic output and a tactile output. The vibrating member may be contiguous with a user.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1:
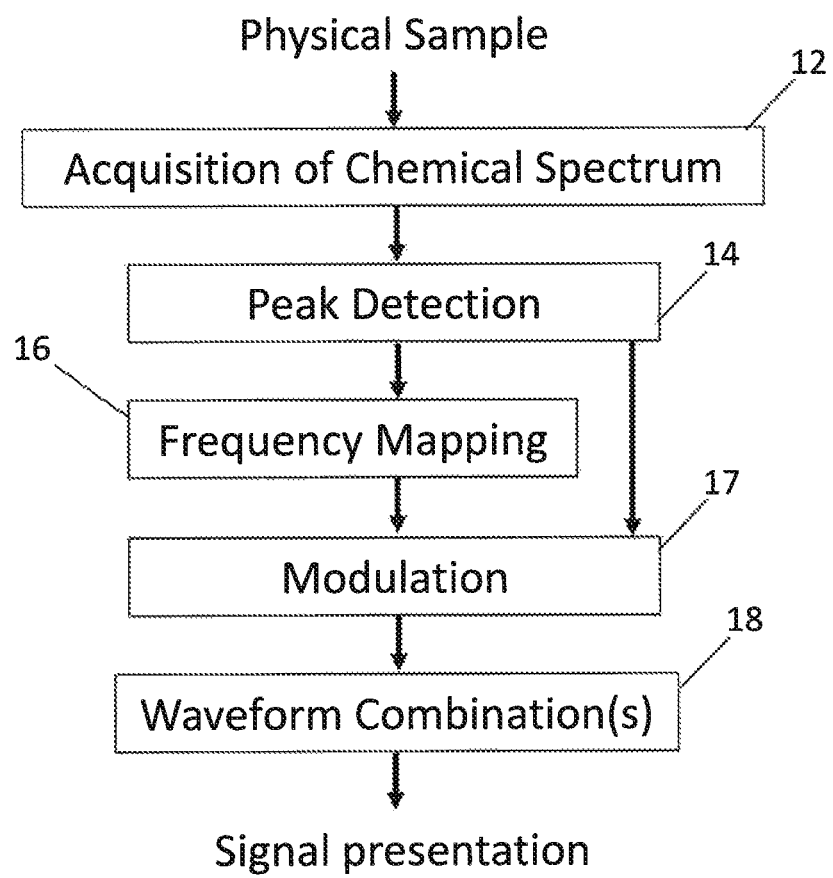
FIG. 1 is a block diagram of a workflow for transforming a chemical spectrum to a complex signal that is to be presented to a human observer, according to one embodiment.

Considering the drawbacks noted above, it would be advantageous to present a chemical spectrum in a way that is not graphical. As described herein, this may be accomplished by associating a mass/charge ratio with a fundamental frequency of a periodic function, the function being substantially within the perceptual range of a human user. Parameters of the periodic function may be scaled, i.e., modulated (e.g., amplitude, angle), according to certain values of the chemical spectrum. For example, the amplitude and/or frequency of a periodic function may be modulated, and multiple modulated periodic functions may be composed into one or more presentation functions (also referred to herein as complex waveforms). Thus, according to an embodiment described herein, a single-value chemical spectrum is presented to a human user acoustically, so that the human user can audibly process the presentation waveform. In another embodiment, a single-value chemical spectrum is presented to a human user acoustically and haptically, so that the human user can audibly and haptically process the presentation waveform. In another embodiment, one or more chemical spectrums each comprising one or more values are presented to a human user acoustically, haptically, or both acoustically and haptically. In another embodiment, a single presentation function is presented to a human user as a physical vibration that for tactile or haptic sensing. In another embodiment, a plurality of physical vibrations are presented, for example, to multiple finger digits.

As used herein, the term "chemical spectrum" refers generally to chemical spectrum data for a sample obtained by any acceptable technique, such as mass spectrometry (e.g., using a mass spectrometry apparatus such as, but not limited to, MALDI or DESI), Raman spectroscopy, etc.

In one aspect, a chemical spectrum is presented to a human user by associating a value of the chemical spectrum with a periodic function, such as, e.g., a sinusoidal function, a square-wave function, a saw tooth function, etc. One embodiment comprises varying the amplitude of the periodic function according to the chemical spectrum's value. Another embodiment comprises varying the frequency of the periodic function according to the chemical spectrum's value. For a spectrum comprising a single value, this periodic function may be presented to a human user acoustically using a loudspeaker, headphones, or any like transduction apparatus. For a chemical spectrum comprising a plurality of values, a plurality of periodic functions may be associated with the spectrum's values; the amplitude or frequency of each periodic function may be independently varied according to corresponding values of the chemical spectrum, and the plurality of the periodic functions may be combined by, for example, a process of superposition such as by summation of the functions. The resulting combination of periodic functions may be presented acoustically using the same technique by which a single periodic function can be presented.

In another aspect, the single periodic function or a combination of periodic functions that are associated with a chemical spectrum may be presented to a human user as a tactile sensation. For example, the tactile sensation may be provided by generating a vibratory output motion that can be sensed by a human operator as a tactile or haptic sensation. The vibratory motion may be implemented in a handle, a button, or a membrane of an instrument, item, device, equipment, etc.

Embodiments may comprise a workflow such as that generally illustrated in FIG. 1. Embodiments may be implemented, at least in part, on programmed media for use with a computer and with chemical spectrum data such as that obtained using, for example, MALDI, DESI, or Raman spectroscopy. The programmed media comprises a computer program stored on non-transitory storage media compatible with the computer, the computer program containing instructions to direct the computer to perform one or more of the functions described herein. The computer may include a processor that performs one or more functions such as analyzing data, signal processing, displaying results and/or images on a display screen, and outputting presentation waveforms, according to the programmed media and optionally with user input. The computer may include a user interface (e.g., a graphical user interface (GUI)) for receiving and processing input (e.g., commands) from a user, etc.).

Referring to FIG. 1, chemical spectrum data obtained by analysis of a physical sample is input 12 to the workflow. Various signal processing is applied to the data to derive relevant information; for example, to detect the location and relative intensity one or more peaks 14 in the chemical spectrum. Each peak is used to determine a fundamental frequency of a periodic function, i.e., a periodic waveform (frequency mapping 16) and to determine a modulation, such as amplitude or frequency modulation 17, of the periodic function. For example, each peak may be amplitude-modulated according to the relative concentration of the corresponding peak in the processed chemical spectrum. Each peak is used to produce a corresponding amplitude-modulated periodic waveform. The amplitude-modulated periodic waveforms are combined 18 into one or more complex waveforms. The complex waveform or waveforms are output for presentation to a human observer through a transducer (e.g., audio and/or tactile). For example, a single complex waveform may be presented as a single auditory or haptic signal. As another example, two complex waveforms may be presented as a stereophonic auditory signal, or as two distinct haptic signals.

In other embodiments, each peak may be frequency modulated according to, for example, the relative concentration of the corresponding peak in the processed mass spectrum. For example, this may be accomplished by increasing the fundamental frequency to produce a rising tone, by decreasing the fundamental frequency to produce a falling tone, by alternately increasing and decreasing the fundamental frequency to produce a vibrato, or any other way of frequency modulating the fundamental frequency of the periodic function. The periodic function may itself be a complex waveform, such as a Shepard tone that has a base frequency; such a tone may be amplitude modulated to change the perceived acoustic volume or haptic intensity of the periodic waveform, or frequency modulated to alter the rate of repetition of systematic changes within the complex periodic function.

According to one embodiment, a chemical spectrum with a single value may be presented acoustically. The spectrum value may be interpreted as having two components, the first component being a number on an ordinate axis such as the mass/charge ratio that is transduced by a mass spectrometry device, and the second component being a non-zero intensity of a chemical constituent. This single spectrum value may be acquired by analog-to-digital conversion, by transmission from the spectrometry device to the presentation device, by intervening storage of the spectrum value, or by any other way of acquiring the spectrum value. The first component of the spectrum value may be used to select the fundamental frequency of a periodic function, such as a sinusoidal function. The second component of the spectrum value, being non-negative, may be used to modulate the periodic function. For example, the second component may be used to determine the absolute or relative amplitude of the periodic function. For example, two determinations that the inventor has found useful are to use the component value or the square of the component value. Other types of determinations may of course be used. The resulting periodic function may be presented to a human user acoustically by directing the output of a processor to produce a sound, such as by a loudspeaker, a headphone speaker, etc.

According to this embodiment, the first component of the spectrum value may be associated with a fundamental frequency that is within the generally accepted range of human hearing, such as between about 20 Hz and about 20,000 Hz. The range of the fundamental frequency may also be customized to a specific human user, to account for individual perceptual capabilities or individual preferences. For a chemical spectrum with a single value that is a mass/charge ratio between 20 and 20,000 the association between the first component and the fundamental frequency may be a mapping. For other mass/charge ratios, a scaling process such as a window/level computation may be used. Other mappings between the ordinate axis of a chemical spectrum and a fundamental frequency may also be used, such as a rational polynomial or an exponential mapping. For infrasound presentation, a fundamental frequency of less than 20 Hz may be used. For ultrasound presentation, a fundamental frequency of greater than 20,000 Hz may be used.

In another embodiment, a chemical spectrum comprising a plurality of spectrum values may be associated with a plurality of periodic functions. Using the same reasoning as was used for the first embodiment, the first component of each spectrum value may be associated with a periodic function; there may be one or more such periodic functions, provided that the number of periodic functions does not exceed the number of values in the chemical spectrum. The inventor has tested mappings such as a linear mapping of a mass/charge ratio to a fundamental frequency between 100 Hz and 1,000 Hz whereby increasing values of first components are associated with increasing values of fundamental frequencies, and has also tested linear mappings whereby increasing values of first components are associated with decreasing values of fundamental frequencies. By these techniques a plurality of periodic functions may be determined.

According to this embodiment, for each periodic function, it is useful to associate the second component of the associated value of the chemical spectrum with the amplitude of the periodic function. One way that this can be performed is to normalize the chemical spectrum, for example, by dividing the second component of each value with the largest second component so that each value of the chemical spectrum is normalized to a number between 0 and 1. Each normalized value may be used to determine the relative amplitude of the associated periodic function, for example, by using the normalized value or by using the square of the normalized value. This determination is effectively an amplitude modulation of the plurality of periodic functions. This plurality of periodic functions may be combined into a single presentation function, for example by summation or superposition. In this process of combination, the relative phase of each periodic function may also be varied according to the first component or the second component of the associated value of the chemical spectrum. The mapping between the first component of each value of the chemical spectrum and the fundamental frequency of associated periodic function may be accomplished by the technique described above for the first embodiment. The resulting presentation function may be presented acoustically as described above.

In another embodiment, the first component of each value of a chemical spectrum may be mapped to a fundamental frequency that is within the generally accepted range of human tactile or haptic perception, such as between 1 Hz and 1,000 Hz. The range of the fundamental frequency may also be customized to a specific human user, to account for individual perceptual capabilities or individual preferences. Using the method of the first embodiment or the method of the second embodiment, a presentation function may be produced from the chemical spectrum. The resulting presentation function may be presented mechanically to a human user, who perceives the mechanical presentation as a tactile or haptic sensation. Fundamental frequencies less than 1 Hz and greater than 1,000 Hz may also be used for tactile presentation of the presentation function.

Some forms of mass spectrometry introduce values of a chemical spectrum that are not those of the chemical substance that is being studied. For example, DESI and MALDI spectrometry may require the use of a solvent, and REIMS spectrometry may require the thermal vapourization of a substance. In these and other forms of spectrometry, there may be one or more background chemical spectrums that can be suppressed in the acoustic or tactile presentation. The inventor has tested this suppression by selecting a set of chemical spectrums that are deemed to contain background signals; the first component of each value of a background spectrum may be used to attenuate or suppress the value of a chemical spectrum that is being presented to a human user.

Suppression may be accomplished by eliminating the values of a chemical spectrum that have a first component that is close to the first component of any value in the background spectrum. Attenuation may be accomplished by diminishing the second component of a value of a chemical spectrum that is being presented, where the first component of the value is close to the first component of any value in the background spectrum. Suppression or attenuation may be accomplished using a background spectrum, using peaks that are detected in the background spectrum, using peaks that are detected in the chemical spectrum that is being presented, or using any combination of the values and peaks of the background spectrum and the chemical spectrum that is being presented. The background spectrum may be found from a single chemical spectrum or as the result of information processing of a plurality of background spectrums.

In another embodiment, a plurality of chemical spectrums are used for acoustic presentation to a human user by a plurality of acoustic devices. For example, a first chemical spectrum may be provided to a first acoustic device that is substantially heard by a human user with the left ear and a second chemical spectrum may be provided to a second acoustic device that is substantially heard by a human user with the right ear, or vice versa. In this embodiment, a human user can appreciate differences between the first chemical spectrum and the second chemical spectrum. For example, the first chemical spectrum can be a background chemical spectrum.

In another embodiment, a plurality of chemical spectrums are used for tactile presentation to a human user by a plurality of mechanical devices. For example, the acoustic methods of the fourth embodiment can be replaced with tactile methods, whereby a human user can appreciate differences between the first chemical spectrum and the second chemical spectrum.

In further embodiments, methods for acoustic and tactile (i.e., haptic) presentation as described above may be combined.

Another aspect of the invention relates to an apparatus including a processor that carries out one or more of the embodiments described herein. For example, the processor may carry out one or more of the functions set forth in the work flow of FIG. 1. In one embodiment, the apparatus comprises an input that receives at least one chemical spectrum, the at least one chemical spectrum comprising at least one value, the at least one value having at least a first component and a second component; wherein the processor: i) selects at least one periodic function for each first component of the at least one value of the at least one spectrum, wherein the periodic function is selected by a single spectrum value or by a plurality of spectrum values; ii) modulates each periodic function according to the second component of the at least one value; iii) composes the modulated periodic functions into at least one presentation function; and an output that simultaneously outputs each presentation function, comprising a transducer such as an acoustic device, a tactile device, or a combination thereof.

The invention will be further described by way of the following non-limiting examples.

EXAMPLE 1

Figure 2:
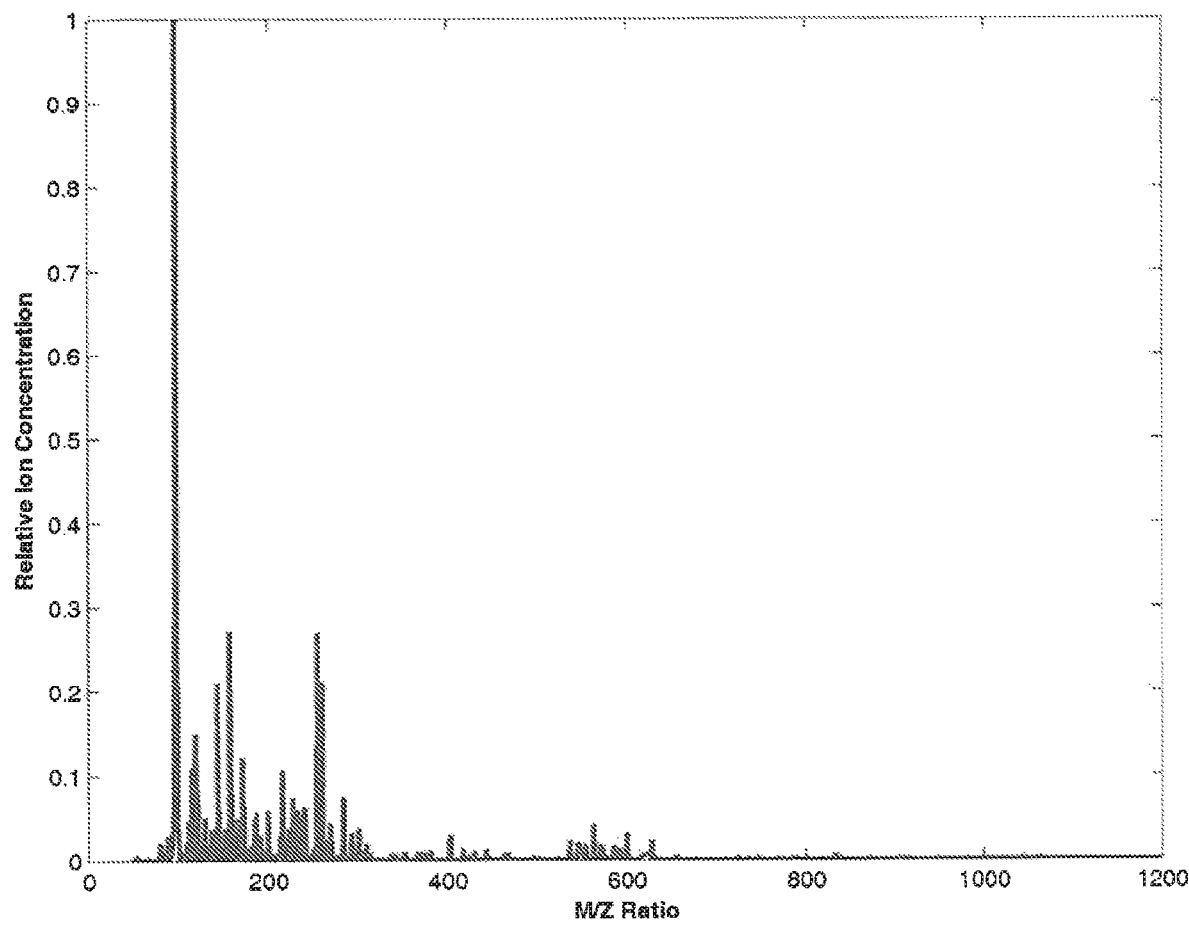
FIG. 2 is a representative mass spectrum of a substance that may contain malignant cells, wherein the abscissa axis is the mass-charge ratio as determined by mass spectrometry, with units of atomic mass divided by unit charge, and the ordinate axis is the relative concentration of the respective ions.
Figure 3:
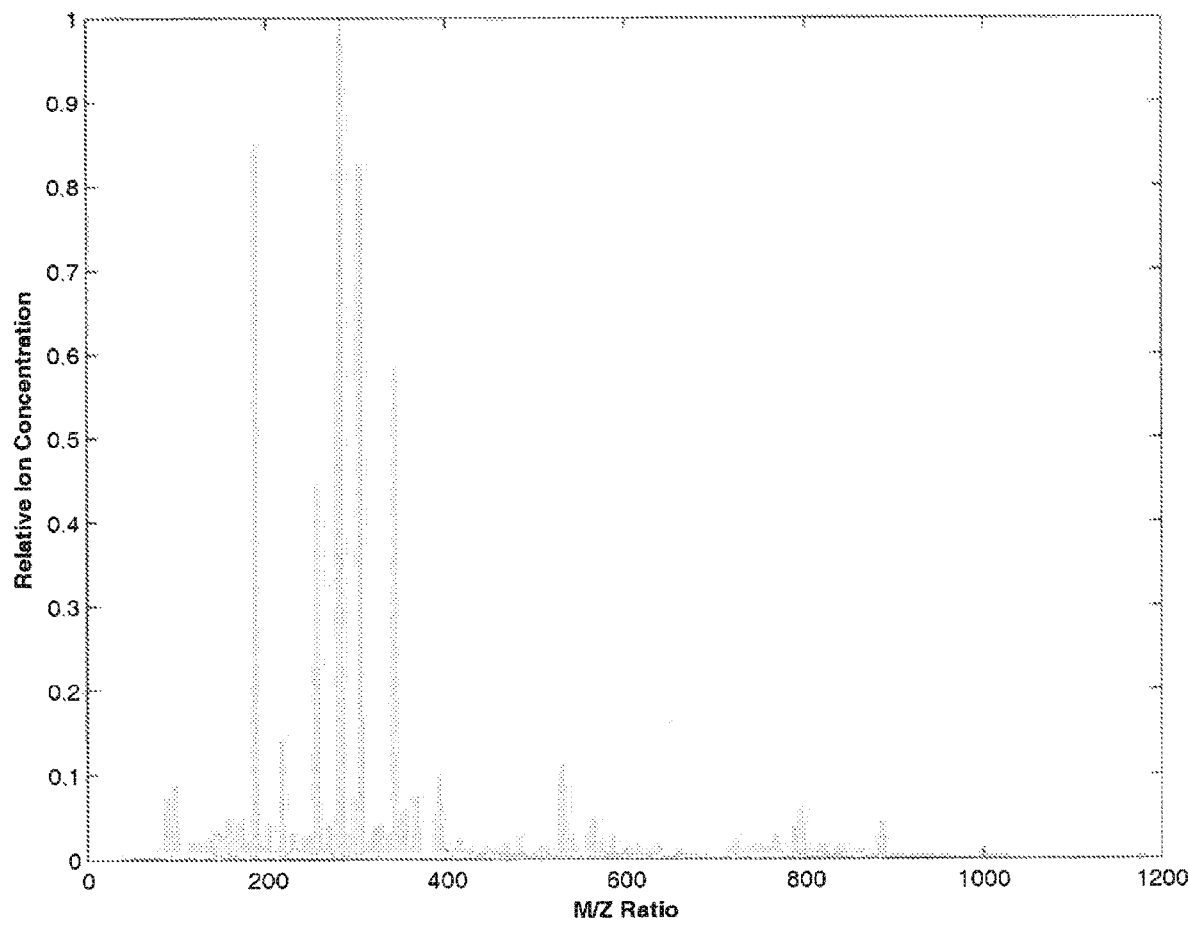
FIG. 3 is a representative mass spectrum of a substance that may contain benign cells, wherein the abscissa axis is the mass-charge ratio as determined by mass spectrometry, with units of atomic mass divided by unit charge, and the ordinate axis is the relative concentration of the respective ions.

Consider a mass spectrum that is derived from a DESI device that was used to scan microscopic samples of tissues. This spectrum can be normalized so that all values are scaled relative to the most prevalent mass-charge ratio, so that the spectrum is of relative ion concentration. One scan might be of tissue suspected to contain malignant cells, producing a mass spectrum such as that in FIG. 2, wherein the mass-charge ratios are substantially between 50 atomic mass units per charge number and 1000 atomic mass units per charge number. A second scan might be of tissue suspected to contain only benign cells, producing a mass spectrum such as that in FIG. 3 with a similar restriction on the mass-charge ratios of the spectrum. By inputting these MS data into a work flow such as described herein, such as that shown in FIG. 1, single mass-charge ratio within these values may be directly mapped to an frequency measured in vibrations per second, that is, in Hertz units. The frequency may be within the range of human hearing, and output via a loudspeaker for audible detection by a human observer.

EXAMPLE 2

Figure 4:
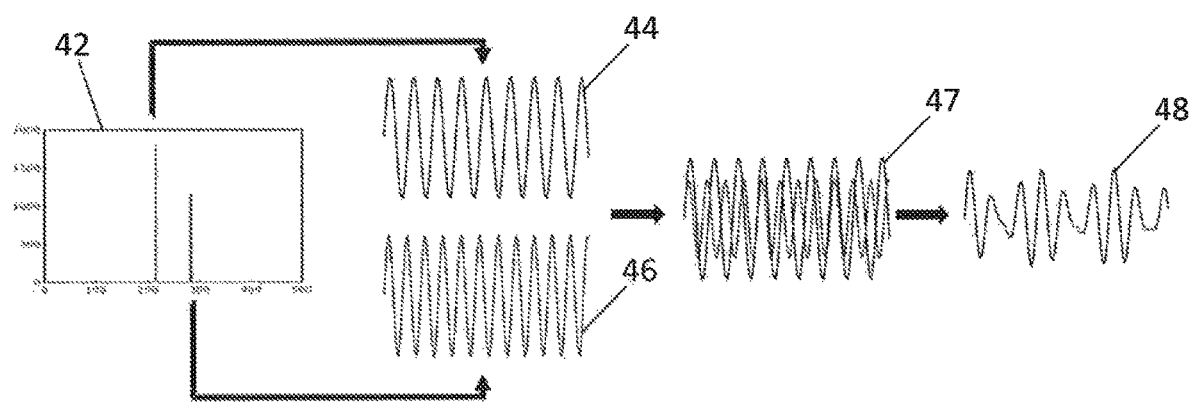
FIG. 4 is a diagram illustrating a process for transforming a mass spectrum to a complex signal that is to be presented to a human observer, according to one embodiment.

Consider a mass spectrum that has been modified by signal processing to detect significant peaks of relative ion concentration. For example, as shown in FIG. 4, the modified spectrum 42 might include two peaks at distinct mass-charge ratios. The two peaks in the mass spectrum are each individually used to select a periodic function such as a sinusoidal wave, each sinusoidal wave 44, 46 having a distinct fundamental frequency that is derived from the mass-charge ratio of its respective peak. The peak having a lower mass-charge ratio may be mapped to a sinusoidal wave that has a first selected frequency 44. The peak having a higher mass-charge ratio may be mapped to a sinusoidal wave that has a second selected frequency 46 higher than that of the first selected frequency for the lower peak. The amplitude of each sinusoidal wave may be independently scaled in magnitude 47. For example, amplitude may be modulated by uniformly scaling according to a value that is derived from the mass-charge ratio of its respective peak. The scaled sinusoidal waves may be combined into a single more complex wave 48 for presentation to a human observer. This combined waveform may, in one embodiment, be used to control a loudspeaker so that the human observer can hear the mass-charge spectrum that has been derived from a physical sample of a substance such as tissue.

EXAMPLE 3

In Examples 1 and 2, the waveforms may be periodic in nature. Each waveform may be a sinusoidal wave, a square wave, a waveform synthesized algorithmically, a waveform derived from sampling a musical instrument, a waveform derived from sampling recorded music, or any other source of a periodic wave. The amplitude of each waveform may be constant, may have an attack-decay-sustain-release pattern of amplitude, or may have any other amplitude envelope. The fundamental frequency of each waveform may be algorithmically selected, restricted to musical frequencies, optimized for a sub-population of human observers including but not limited to preferred musical scales, or selected according to any other process for selecting a fundamental frequency from a mass-charge ratio.

EXAMPLE 4

The utility of the invention can be appreciated by considering a scenario of its application. A human observer, such as a physician or a scientist or any other observer, may wish to explore a mass-spectrometry image that has been acquired using MALDI or DESI or a Raman spectroscopy signal or any other mass spectroscopy technique. Such an image comprises a plurality of pixels. Each pixel comprises a chemical spectrum. For a human observer to explore both the image and the chemical spectrum of one or more pixels, the image and the chemical spectrum or spectra of the pixel or pixels may be simultaneously presented on a computer display. To attend to both the image and the spectral information, a human observer must shift gaze from one part of the display to another, or must integrate the simultaneous presentation of both the image and the spectral information. Embodiments as described herein provide an acoustic presentation so that an observer can visually explore the image and listen to the spectral information, freeing the observer from attending to an otherwise complex visual display. Alternatively, embodiments as described herein provide a haptic presentation so that an observer can visually explore the image and feel the spectral information, freeing the observer from attending to an otherwise complex visual display. Further embodiments provide both acoustic and haptic presentations to the human observer so that the observer can have a multimodal experience of the spectral information.

Equivalents

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A method for presenting a chemical spectrum, comprising:
   a) acquiring at least one chemical spectrum, the at least one chemical spectrum comprising at least one value, the at least one value having at least a first component and a second component;
   b) selecting at least one periodic function for each first component of the at least one value of the at least one chemical spectrum,
   wherein the periodic function is selected by a single spectrum value or by a plurality of spectrum values;
   c) modulating the at least one periodic function according to the second component of the at east one value;
   d) composing modulated periodic functions into at least one complex function;
   e) outputting each complex function using at least one transducer.

2. The method of claim 1, wherein the at least one chemical spectrum comprises a mass spectrometry signal.

3. The method of claim 1, wherein the at least one chemical spectrum comprises a Raman spectroscopy signal.

4. The method of claim 1, wherein modulating the at least one periodic function comprises amplitude-modulating the at least one periodic function according to the second component of the at least one value.

5. The method of claim 1, wherein modulating the at least one periodic function comprises frequency-modulating the at least one periodic function according to the second component of the at least one value.

6. The method of claim 1, wherein the composing comprises summation.

7. The method of claim 1, wherein outputting comprises producing an acoustic output using a loudspeaker.

8. The method of claim 1, wherein outputting comprises producing a tactile output using a vibrating member.

9. The method of claim 8, wherein the vibrating member is contiguous with a user.

10. The method of claim 1, wherein outputting comprises producing an acoustic output and a tactile output.

11. An apparatus, comprising:
    an input that receives at least one chemical spectrum, the at least one chemical spectrum comprising at least one value, the at least one value having at least a first component and a second component;
    a processor that:
    i) selects at least one periodic function for each first component of the at least one value of the at least one chemical spectrum,
    wherein the periodic function is selected by a single spectrum value or by a plurality of spectrum values;
    ii) modulates the at least one periodic function according to the second component of the at least one value;
    iii) composes the modulated periodic functions into at least one complex function; and
    a transducer that outputs each complex function.

12. The apparatus of claim 11, wherein the at least one chemical spectrum is a mass spectrometry signal.

13. The apparatus of claim 11, wherein the at least one chemical spectrum is a Raman spectroscopy signal.

14. The apparatus of claim 11, wherein modulating the at least one periodic function comprises amplitude-modulating the at least one periodic function according to the second component of the at least one value.

15. The apparatus of claim 11, wherein modulating the at least one periodic function comprises frequency-modulating the at least one periodic function according to the second component of the at least one value.

16. The apparatus of claim 11, wherein the composing comprises summation.

17. The apparatus of claim 11, wherein the transducer comprises a loudspeaker that produces an audible output.

18. The apparatus of claim 11, wherein the transducer comprises a vibrating member that produces a tactile output.

19. The apparatus of claim 18, wherein the vibrating member is contiguous with a user of the apparatus.

20. The apparatus of claim 11, wherein the transducer comprises a loudspeaker that produces an audible output and a vibrating member that produces a tactile output.

21. Programmed media for use with a computer, the programmed media comprising a computer program stored on non-transitory storage media compatible with the computer, the computer program containing instructions to direct the computer to perform one or more of:
    a) acquire at least one chemical spectrum, the at least one chemical spectrum comprising at least one value, the at least one value having at least a first component and a second component;
    b) select at least one periodic function for each first component of the at least one value of the at least one chemical spectrum,
    wherein the periodic function is selected by a single spectrum value or by a plurality of spectrum values;
    c) modulate the at least one periodic function according to the second component of the at least one value;
    d) compose modulated periodic functions into at least one complex function; and
    e) output each complex function to an acoustic device, a tactile device, or a combination thereof.

* * * * *